US008635549B2

(12) United States Patent
Perry et al.

(10) Patent No.: US 8,635,549 B2
(45) Date of Patent: Jan. 21, 2014

(54) DIRECTLY ASSIGNING DESKTOP BACKGROUNDS

(75) Inventors: David B. Perry, Bothell, WA (US); Kenneth Sean Gilmour, Issaquah, WA (US); Sanjeev Kewal Verma, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 170 days.

(21) Appl. No.: 13/024,588

(22) Filed: Feb. 10, 2011

(65) Prior Publication Data
US 2012/0210263 A1   Aug. 16, 2012

(51) Int. Cl.
*G06F 3/048* (2013.01)

(52) U.S. Cl.
USPC ........... 715/769; 379/413; 715/762; 345/634; 725/131

(58) Field of Classification Search
None
See application file for complete search history.

(56) References Cited

U.S. PATENT DOCUMENTS

| | | | |
|---|---|---|---|
| 5,835,090 A | | 11/1998 | Clark |
| 2002/0140724 A1 | | 10/2002 | Qureshi et al. |
| 2006/0038741 A1 | | 2/2006 | Mori |
| 2007/0036346 A1 | * | 2/2007 | Kwon ........................... 379/413 |
| 2007/0296738 A1 | * | 12/2007 | Louch et al. .................. 345/634 |
| 2009/0103144 A1 | * | 4/2009 | Kim .............................. 715/762 |
| 2009/0165073 A1 | * | 6/2009 | Stallings ....................... 725/131 |

OTHER PUBLICATIONS http://we.archive.org/web/201011011033859/http://www.displayfusion.com/Features/Wallpaper/[10/5/2012 6:38:23 PM] Multi Monitor Wallpaper.*
DynaDeskXP—Published Date: Mar. 30, 2008 http://www.dynadeskxp.com/.
UltraMon—Published Date: Feb. 15, 2010 http://www.realtimesoft.com/ultramon/.
Vista/XP Virtual Desktop Manager—Retrieved Date: Sep. 23, 2010 http://vdm.codeplex.com/.
Zenview Manager—Retrieved Date: Sep. 23, 2010 http://www.digitaltigers.com/zenview-manager.asp.
DisplayFusion—Retrieved Date: Sep. 23, 2010 http://www.displayfusion.com/.

* cited by examiner

*Primary Examiner* — Boris Pesin
*Assistant Examiner* — Ayesha Huertas Torres
(74) *Attorney, Agent, or Firm* — Shook, Hardy & Bacon L.L.P.

(57) ABSTRACT

Methods, systems, and computer-storage media for customizing the appearance of a desktop background are provided. The desktop is the bottom surface drawn behind the application windows, gadgets, a task bar, and other user interface elements displayed on a computing screen. Embodiments of the present invention allow a user to customize the background by dragging an image representation from a desktop control panel onto a portion of the desktop. Once dropped onto the desktop, the image associated with the representation is used to generate the desktop background. When the desktop is extended to different monitors, the portion of desktop on each monitor may be customized separately.

19 Claims, 15 Drawing Sheets

DIRECTLY ASSIGNING DESKTOP BACKGROUNDS

BACKGROUND

Some computer programs display a desktop work area on a user interface. The desktop has a background that may be a solid color or incorporate graphic art, an image, or other visual content. The desktop may be extended across multiple monitors. A user may customize some aspects of the desktop background.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention generally relate to a method for customizing the appearance of a desktop background. The desktop is the bottom surface of a graphical user interface. The desktop is drawn behind the application windows, gadgets, task bar, and other user interface elements displayed on a graphical user interface. The desktop may be extended onto multiple computer monitors. Embodiments of the present invention allow a user to customize the background by dragging an image representation from a desktop control panel onto a portion of the desktop. Once dropped onto the desktop, the image associated with the representation is used to generate the desktop background. When the desktop is extended to different monitors, the portion of desktop on each monitor may be customized separately.

BRIEF DESCRIPTION OF THE DRAWINGS

Embodiments of the invention are described in detail below with reference to the attached drawing figures, wherein.

DETAILED DESCRIPTION

Figure 1:
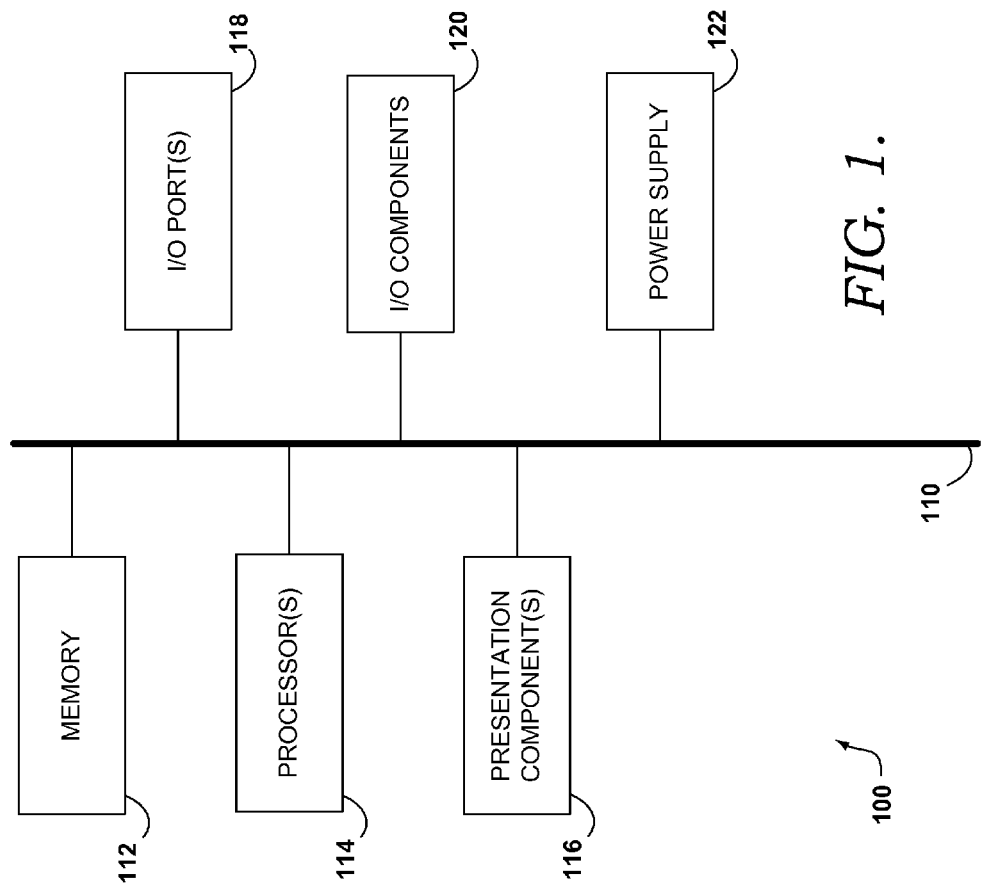
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally related to a method for customizing the appearance of a desktop background. The desktop is the bottom surface of a graphical user interface. The desktop is drawn behind the application windows, gadgets, task bar, and other user interface elements displayed on a graphical user interface. The desktop may be extended onto multiple computer monitors. Embodiments of the present invention allow a user to customize the background by dragging an image representation from a desktop control panel onto a portion of the desktop. Once dropped onto the desktop, the image associated with the representation is used to generate the desktop background. When the desktop is extended to different monitors, the portion of desktop on each monitor may be customized separately.

As part of the customization process, various hotspots may be provided on the desktop. Each hotspot is associated with a particular image-processing format that determines how an image is incorporated into the background. Various image-processing formats include auto fit, auto fill, center, tile, and span. In one embodiment, upon dragging a representation of an image from the desktop control panel onto a portion of the desktop, a preview of the desktop's background is displayed. The preview shows the desktop as it would look with the image incorporated into the desktop background. The preview is generated according to the default image-processing format or a format selected by the user through a hotspot, or otherwise.

Accordingly, in one embodiment one or more computer-storage media having computer-executable instructions embodied thereon for performing a method of customizing a desktop background are provided. The method comprises determining that an image from a plurality of images has been selected by a user through a user interface appearing on a computer display. The method also comprises determining that the user has dragged a representation of the image from the user interface onto a portion of a desktop. The method also comprises determining that the user has dropped the representation of the image onto the portion of the desktop. The method further comprises, without requiring any additional input from the user, generating a new background for the desktop, wherein at least part of the image appears in the new background.

Accordingly, in another embodiment a method of designating images for use customizing a desktop background is provided. The method comprises displaying, on a first monitor that is communicatively coupled to a computing device, a desktop control panel that includes controls that allow a user to customize the desktop's appearance. The method also comprises displaying one or more image representations on the desktop control panel. The method also comprises determining that the user has dragged a representation of a first image from the desktop control panel onto a first portion of the desktop that is displayed on the first monitor. The method also comprises displaying a background preview for the first portion of the desktop, wherein the background preview is generated using the first image. The method also comprises determining that the user has dropped the representation of the first image onto the first portion of the desktop. The method also comprises generating a first background for the desktop that is displayed on the first monitor, wherein at least part of the first image appears in the first background.

Accordingly, in a third embodiment a method for customizing a desktop background is provided. The method comprises displaying, on a monitor that is communicatively coupled to a computing device, a desktop control panel that includes a plurality of image representations each of which is associated with an image. The method also comprises determining that a user has dragged and dropped a representation of an image from the desktop control panel onto a hotspot located on a desktop. The hotspot is associated with an image-processing format that provides instructions for incorporating the image into a background for the desktop. The method also comprises generating the background for the desktop using the image and the image-processing format.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120t. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. Computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Figure 2:
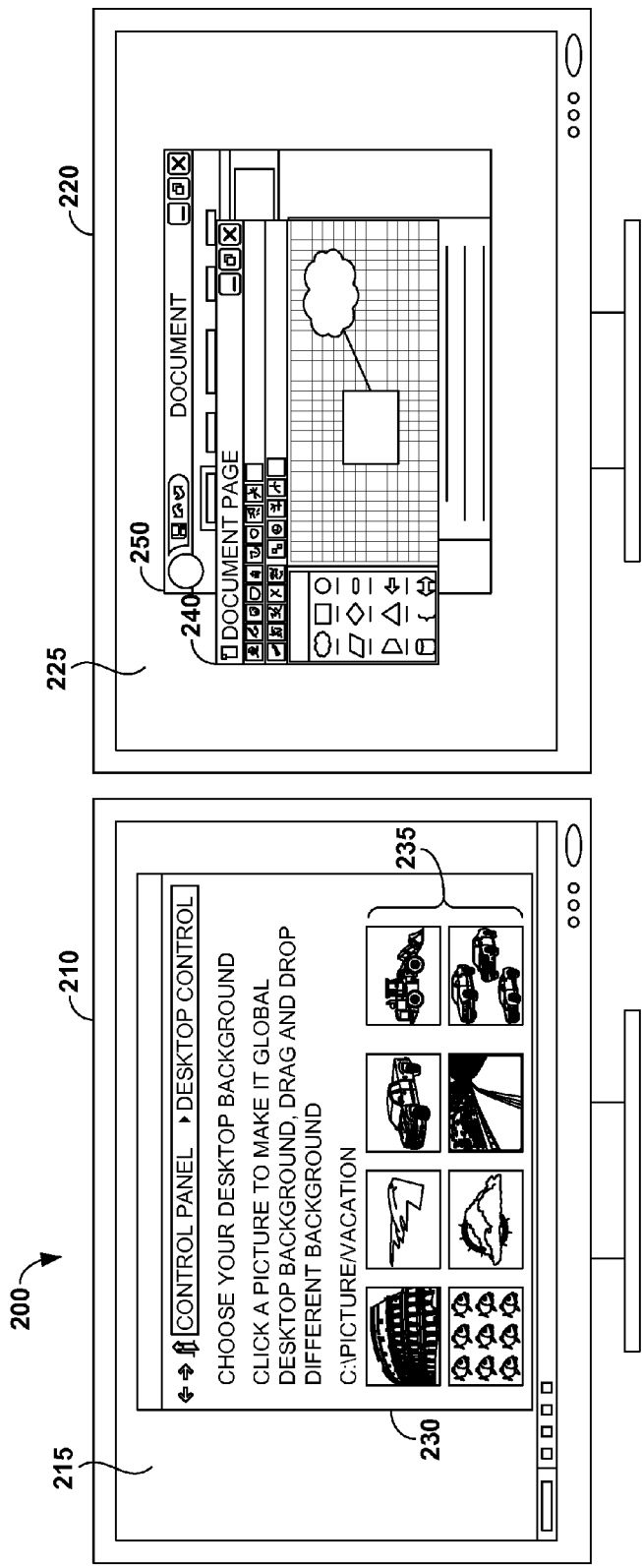
FIG. 2 is a diagram of a computer-display environment that shows a desktop control panel, in accordance with an embodiment of the present invention.

Turning now to FIG. 2, a diagram of a computer-display environment 200 that includes a desktop control panel 230 is shown, in accordance with an embodiment of the present invention. The computer-display environment 200 includes a first monitor 210 and a second monitor 220. In the embodiment shown, monitor 210 and monitor 220 are the identical size. It should be noted that embodiments of the present invention are not limited to environments with identical sized monitors. Embodiments of the present invention may be practiced in a computer-display environment that includes monitors of multiple different sizes.

The computer-display environment 200 includes a desktop that is extended across both monitor 210 and monitor 220. This setup may be described as an extended desktop. The extended desktop acts as a single desktop in many respects. For example, a user can drag application windows from the portion of the desktop on monitor 210 to the portion of the desktop on monitor 220. Monitor 210 and monitor 220 are communicatively coupled to the same computing device. A computer application, such as an operating system, may generate the desktop displayed on both monitors. Initially, the background for the desktop is shown as blank. In other words, the initial background is not based on an image, clipart, or other graphic, but is a solid color, such as blue, white, red, or other such color. Monitor 210 includes a first portion 215 of the desktop with a first background. Monitor 220 includes a second desktop portion 225 the desktop with a second background.

A desktop control panel 230 is displayed in an application window on the first monitor 210. As can be seen, the desktop control panel 230 is displayed on top of the first desktop portion 215. In other words, the user can not see the desktop below the control panel 230. The desktop control panel 230 includes an instruction communicating to the user that the desktop background may be changed by dragging and dropping a picture onto the desktop. A plurality of image representations 235 are displayed on the desktop control panel 230. In this case, the plurality of image representations 235 are those associated with digital pictures found in a vacation folder. A vacation folder is just one example location from which images may be taken. In one embodiment, the desktop control panel 230 allows a user to navigate to various sources of images, clip art, and graphics. The image representations 235 may be thumbnails of the actual image with which the thumbnail is associated.

The second monitor 220 displays application windows 240 and application window 250. These application windows are merely exemplary and are included to illustrate how application windows are treated within some embodiments of the present invention. Treatment of these application windows will become apparent subsequently.

Figure 3:
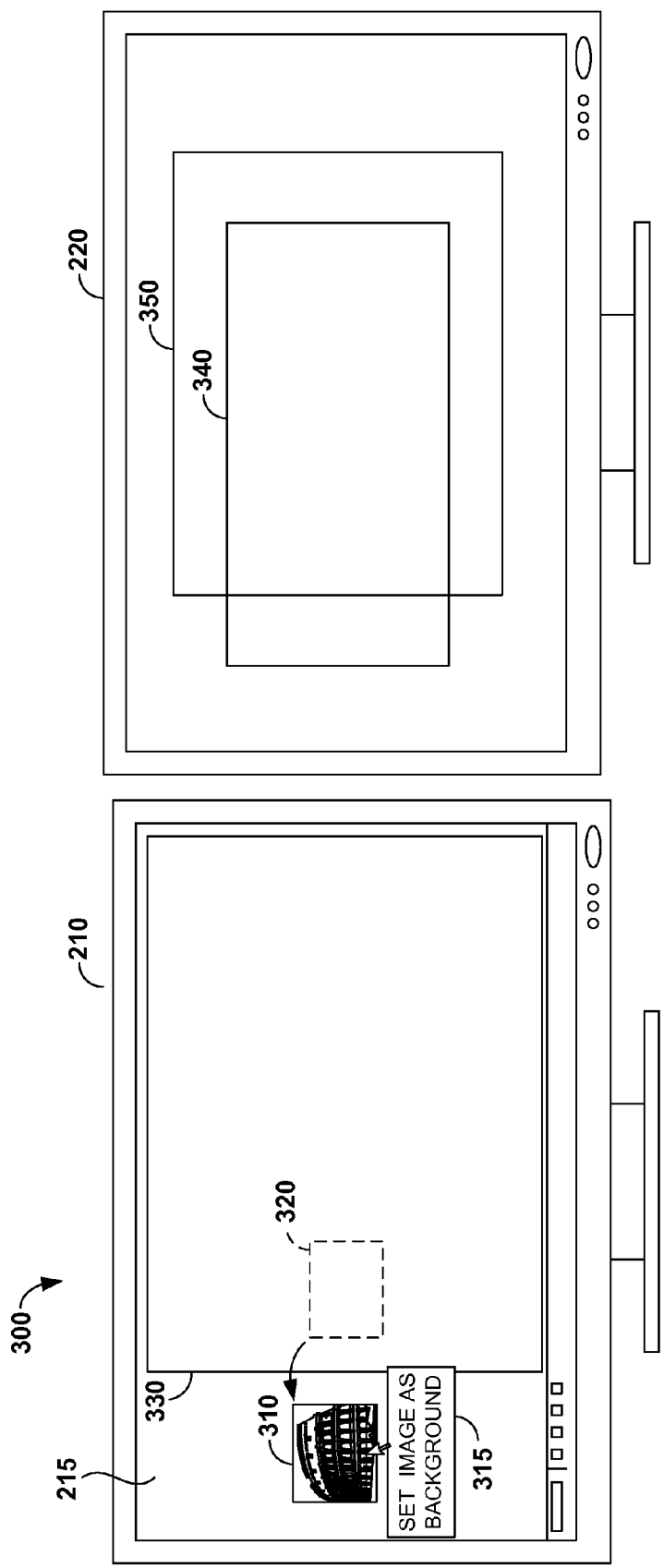
FIG. 3 is a diagram of a computer-display environment showing an image representation being dragged from the desktop control panel to a portion of the desktop on a first monitor, in accordance with an embodiment of the present invention.

Turning now to FIG. 3, a computer-display environment 300 showing an image representation 310 being dragged from the desktop control panel 230 onto the first desktop portion 215 on a first monitor 210 is shown, in accordance with an embodiment of the present invention. In the embodiment illustrated, two things occur as the user selects and drags image representation 310 from its location 320 on the desktop control panel 230 to the first desktop portion 215 of the desktop. First, a hint 315 is shown adjacent to the image representation 310. In this case, the hint 315 communicates to the user that dropping the image representation 310 in its present location causes the image associated with the image representation 310 to be incorporated into the desktop background.

The second change that may take place upon dragging the image representation 310 onto the first desktop portion 215 is that the appearance of all open application windows, or other objects that cover the desktop, may change to reveal the full desktop background. In the embodiment shown, the open application windows are glassified. Glassifying a window renders the window completely transparent with the exception of a frame 330 showing the user where the window was previously located. The application windows shown on monitor 220 are also glassified, leaving only frame 340 and frame 350 to mark their previous location. In an alternative embodiment, all windows other than the window illustrating the desktop control panel 230 are glassified when the desktop control panel 230 is initially opened. As an alternative to glassifying the application windows, the open windows may be minimized while the background is customized. Upon completion of the background customization, the appearance of the application windows may be restored to their original appearance. As will be illustrated subsequently, glassifying the desktop control panel 230 allows the user to cancel the drag operation by dragging and dropping the image back onto the frame 330 of the desktop control panel 230. Other methods of canceling the drag operation include pushing the escape button or right-clicking a mouse button.

Figure 4:
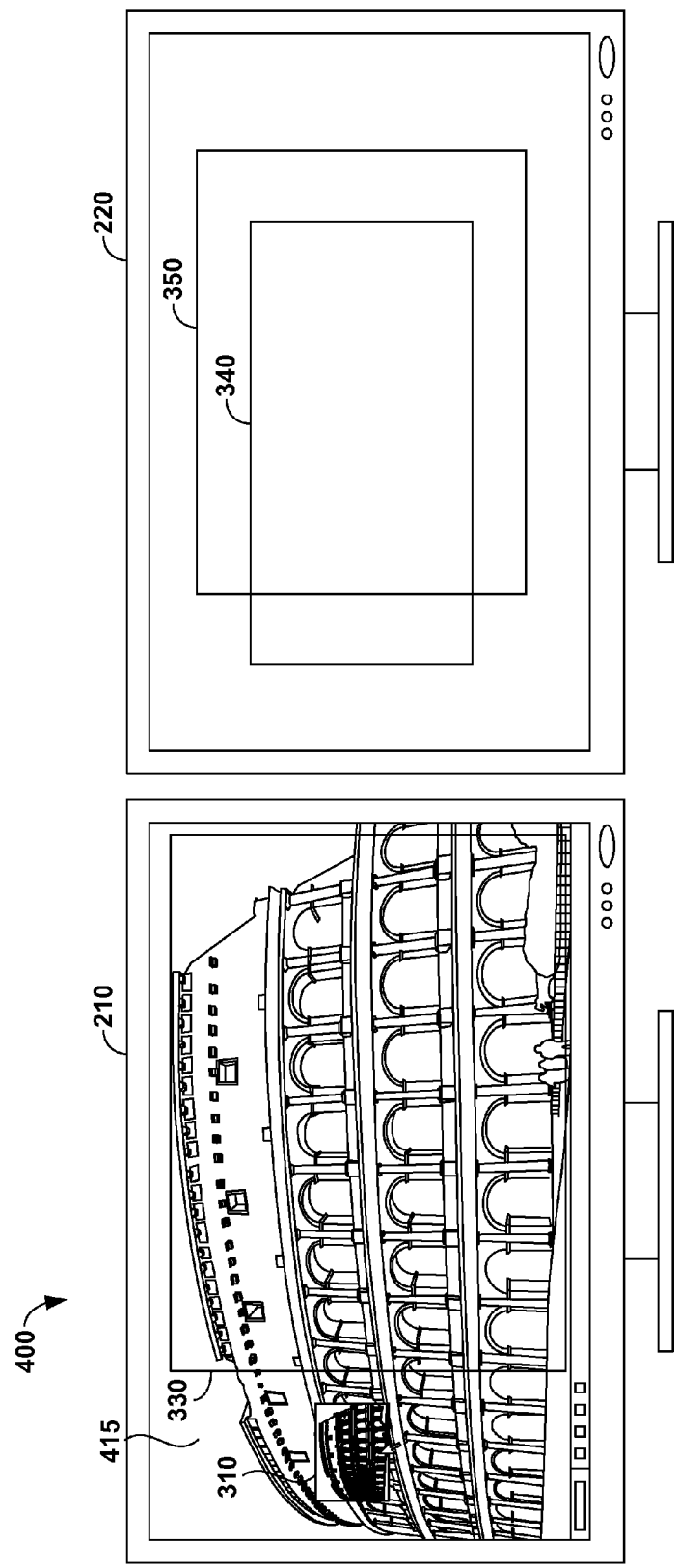
FIG. 4 is a diagram of a computer-display environment showing a preview of the desktop background as it would appear if the image associated with image representation is used to generate the desktop on a first monitor, in accordance with an embodiment of the present invention.

Turning now to FIG. 4, a computer-display environment 400 illustrating a preview 415 of the desktop background as it would appear if the image associated with the image representation is used to generate the desktop is shown, in accordance with the embodiment of the present invention. In this case, the image associated with the image representation 310 is used to generate a preview 415 of the background for the portion of the desktop displayed on monitor 210. In one embodiment, the preview 415 is less than the full resolution of the actual background. Using less than the full resolution communicates that the current display is only a preview.

The preview is generated based on the default image-processing format for incorporating the image into the background. The formats for incorporating the image into the background include the fill format, the fit format, the stretch format, the tile format, the center format, the auto format, and the span format. The fill format enlarges or reduces the image to fill the entire screen while maintaining the image's original aspect ratio. In some cases, the image size is reduced by cropping the image. The fit format enlarges or reduces the image, while maintaining the original aspect ratio, to fit an entire image on the screen, possibly leaving empty space on two sides of the image. The fit format avoids cropping the image. The stretch format enlarges or reduces the image along each axis independently to fill the screen. The stretch format possibly distorts the image, but it avoids cropping the image. The tile format keeps the image at its source size and fills the screen by repeating the image. The center format keeps the image at its source size, possibly leaving empty space around all sides of the image. As suggested by the name, the image is positioned in the center of the desktop. The auto mode determines whether the monitor is a landscape or portrait monitor. In auto mode, landscape images are fit on portrait monitors and fill is used for portrait images on portrait monitors. Further, the auto mode may detect faces in pictures and make sure the face is not cropped. Further, when faces are detected the fill format may be blocked and the fit method, or another backup method, used instead. The span format displays one image across more than one monitor. The image may be stretched or cropped in order to span multiple monitors. Depending on the monitors used, panoramic images may not require any modification to span multiple monitors. In embodiments of the present invention, the modifications to the image, if any, done as part of the spanning operation may be specified by the user. In other words, the user may specify that spanning images are adjusted to the spanning area using one of the previously described image-processing formats.

Returning to FIG. 4, if the user drops the image representation 310 at its location shown in FIG. 4, the drag and drop operation is completed and the image associated with the image representation 310 will be used to generate a background consistent with the preview 415. The user will not need to take any further action regarding that particular portion of the desktop background to assign the image to that portion of the background.

Figure 5:
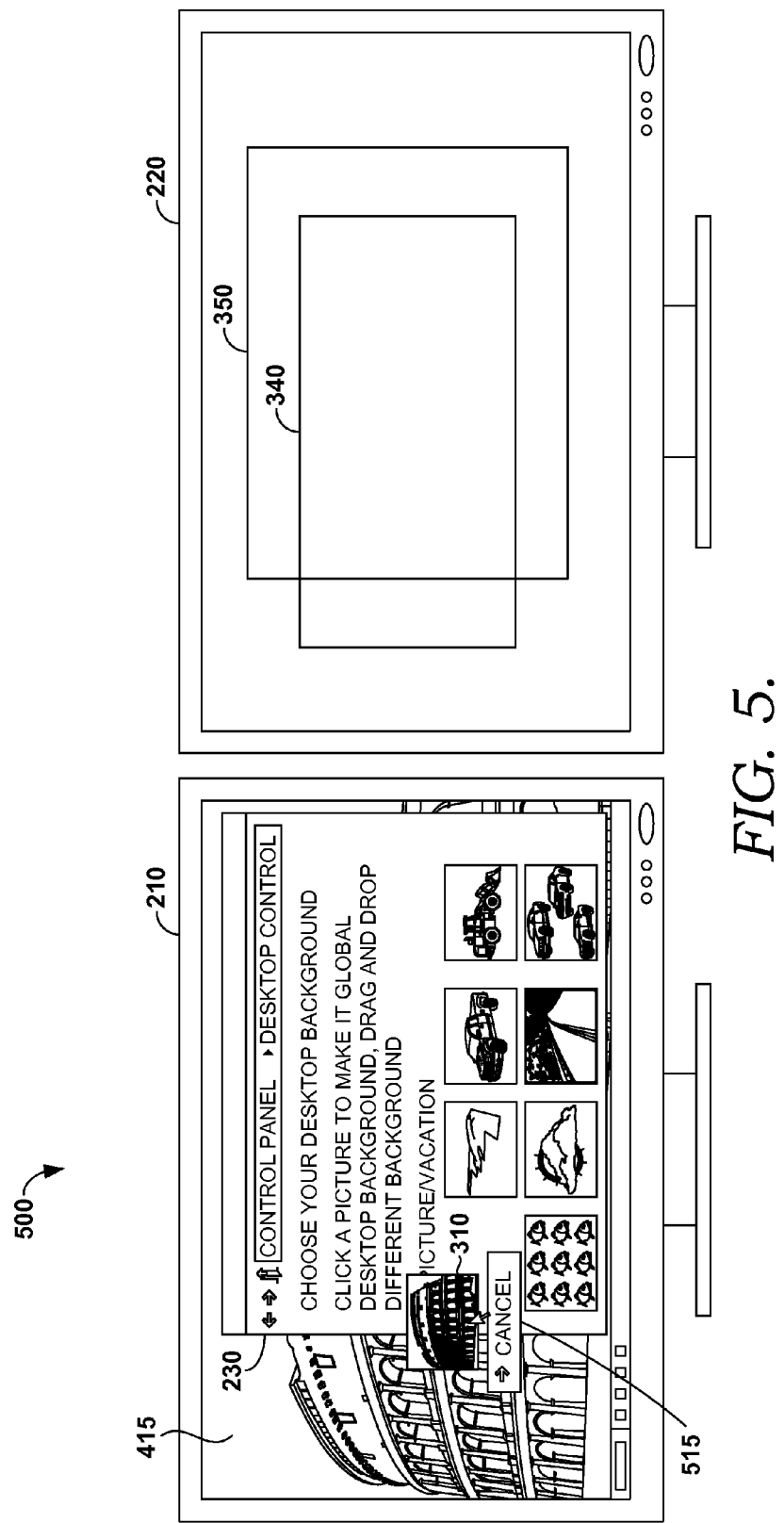
FIG. 5 is a diagram of a computer-display environment showing an image icon being dragged back to the desktop control panel from a portion of the desktop on a first monitor, in accordance with an embodiment of the present invention.

Turning now to FIG. 5, computer-display environment 500 illustrates cancellation of the drag operation, in accordance with an embodiment of the present invention. In one embodiment, upon dragging the image representation 310 back onto the desktop control panel 230, the desktop control panel 230 is deglassified, or otherwise restored to its original appearance, and the hint 515 is changed to indicate that the user may cancel the customization process by dropping the image representation 310 back onto the desktop control panel 230. As described previously, the drag operation may also be canceled by pressing the escape button or right-clicking on the mouse, or by other methods available to the user. Once the drag and drop operation is canceled, the user may select a different image representation or choose not to customize the desktop background. The preview 415, which continues to be shown on FIG. 5, may disappear once the image representation 310 is dragged entirely back onto the desktop control panel 230. In the example shown, the image representation 310 is spanning both the desktop control panel 230 and the desktop background. In one embodiment, the preview 415 disappears once the drag operation is canceled.

In monitor 220, the application windows remain glassified. The application windows 240 and 250 may remain glassified or be returned to their original appearance depending on the criteria used to glassify them in the first place. For example, if the application windows are glassified upon opening the desktop control panel 230, then the application windows could remain glassified until the desktop control panel 230 is closed. On the other hand, if the application windows are glassified upon dragging an image representation from the desktop control panel 230 onto a portion of the desktop, then the appearance of the application windows may be restored upon cancellation of the dragging operation.

Figure 6:
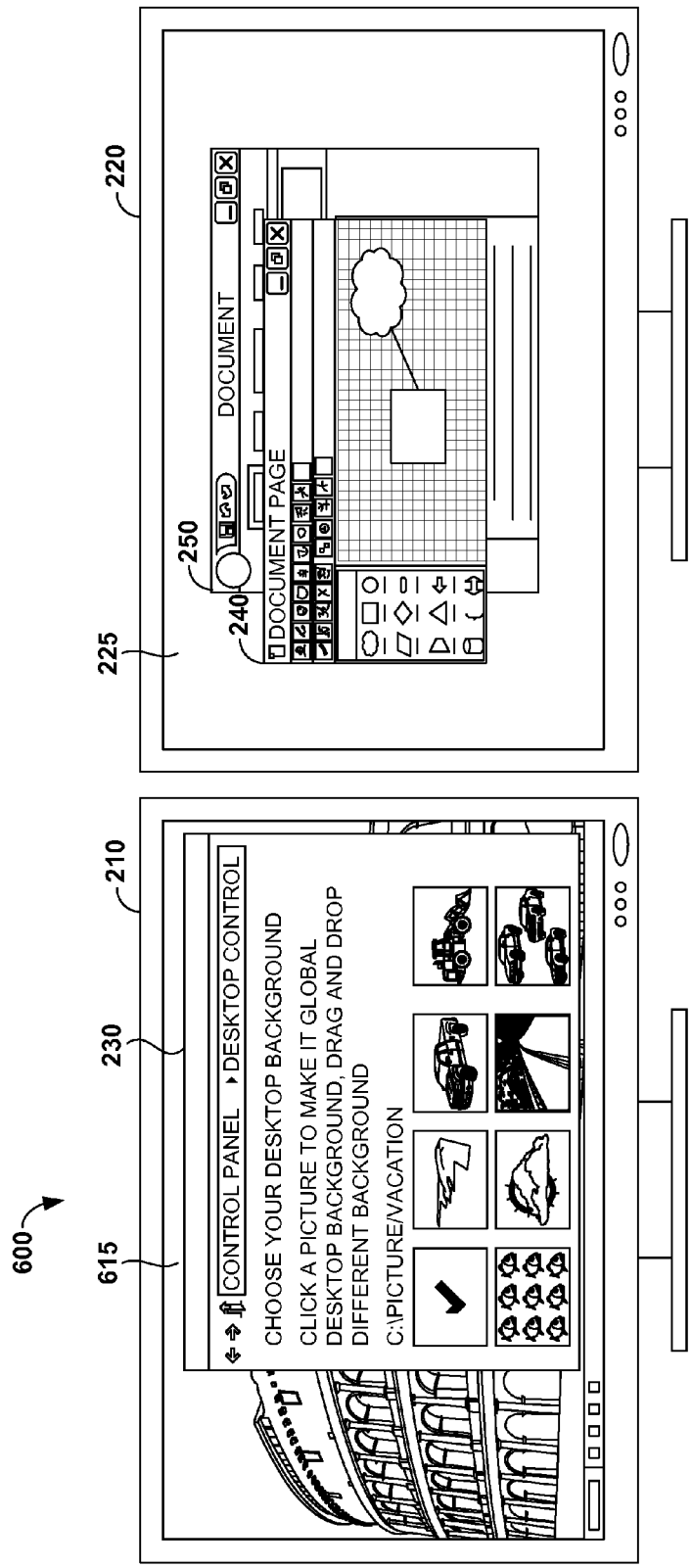
FIG. 6 is a diagram of a computer-display environment showing a new background for the desktop on a first monitor, in accordance with an embodiment of the present invention.

Turning now to FIG. 6, a computer-display environment 600 showing a newly customized background on a first monitor 210 is shown, in accordance with an embodiment of the present invention. FIG. 6 illustrates what the desktop would look like after the user drops the representation of the image onto the desktop. As can be seen, the new background 615 includes the image associated with the image representation 310 shown previously. The desktop control panel 230 has been updated to illustrate that the image associated with image representation 310 has been utilized to form a background. This indication is a check mark. In some embodiments of the present invention, no indication is given on the desktop control panel 230 that an image has been selected for inclusion or use in a desktop background. As can be seen, the background on desktop portion 225 remains a solid color or unaltered. In addition, application windows 240 and 250 have been restored to their previous appearance.

Figure 7:
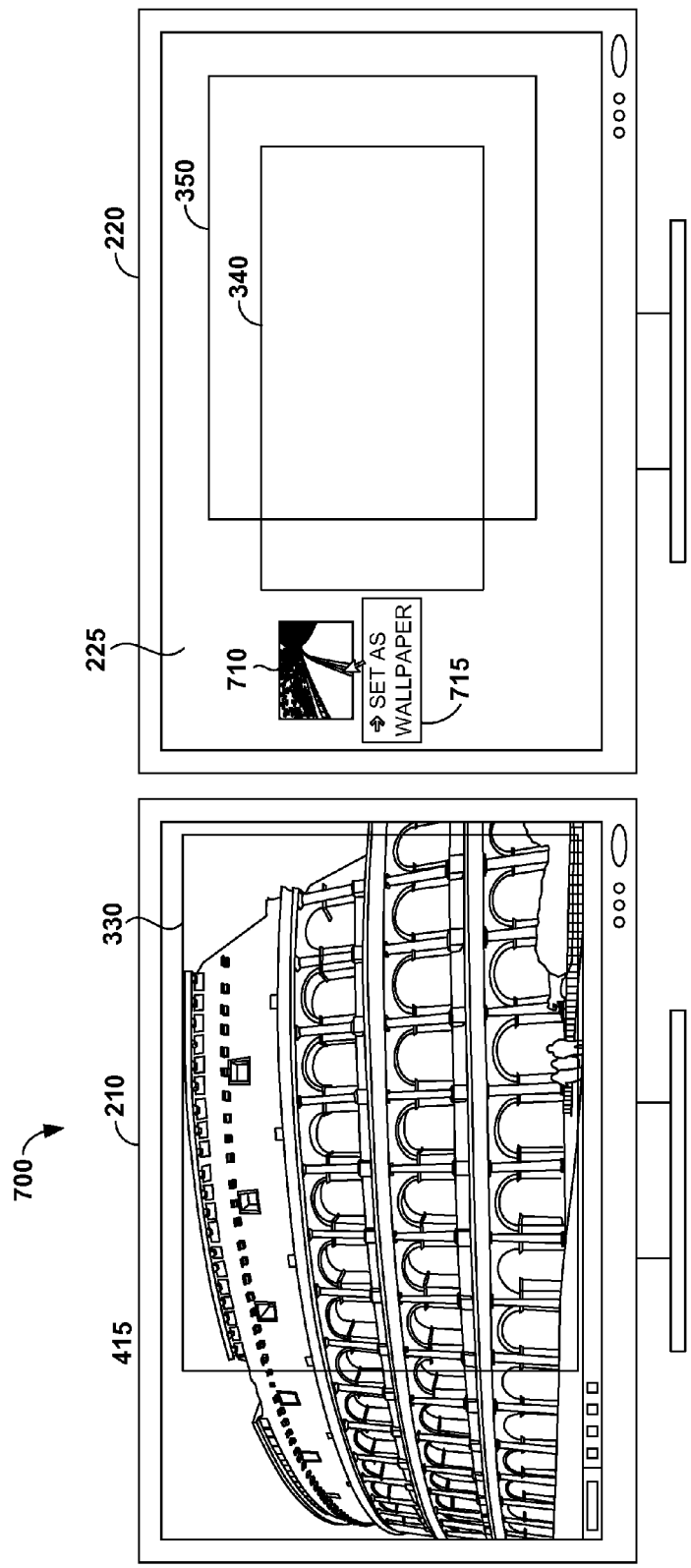
FIG. 7 is a diagram of a computer-display environment showing an image icon being dragged from the desktop control panel to a portion of the desktop on a second monitor, in accordance with an embodiment of the present invention.

Turning now to FIG. 7, a computer-display environment 700 showing customization of a second portion of the desktop is illustrated, in accordance with an embodiment of the present invention. In FIG. 7, an image representation 710 has been dragged from the desktop control panel 230 onto a desktop portion 225 displayed on monitor 220. Upon dragging the image representation 710 onto the desktop portion 225 displayed on monitor 220, a hint 715 is displayed adjacent to the image representation 710. Though not shown in FIG. 7, a preview of the background, generated using the image associated with image representation 710, could be displayed as described previously. Again, the application windows are shown as glassified along with the desktop control panel 230.

Figure 8:
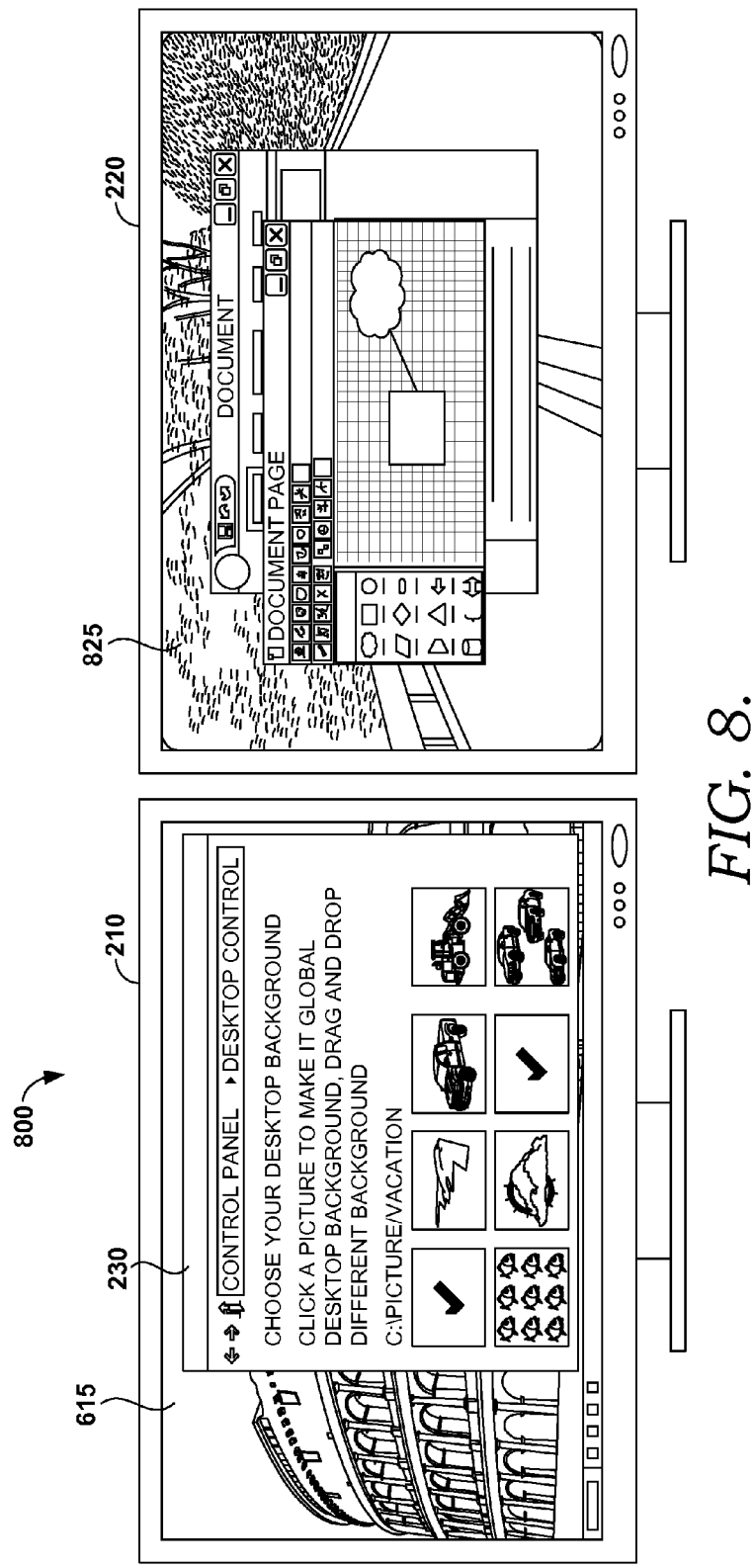
FIG. 8 is a diagram of a computer-display environment showing a new background for the desktop on the first and the second monitor, in accordance with an embodiment of the present invention.

Turning now to FIG. 8, completion of the second customization process is shown. As can be seen, each portion of the desktop has its own background generated based on a different image. Background 615 is generated based on a first image and background 825 is generated based on a second image. The application windows are restored to their previous appearance. Further, the desktop control panel 230 may be updated to indicate that a second image was utilized to generate a portion of the desktop's background. In this case, the second indication is a checkmark in place of the image representation. The customization operation illustrated with monitors 210 and 220 may be repeated with as many monitors as can be supported by the application generating the desktop and the hardware on which the application is running.

Figure 9:
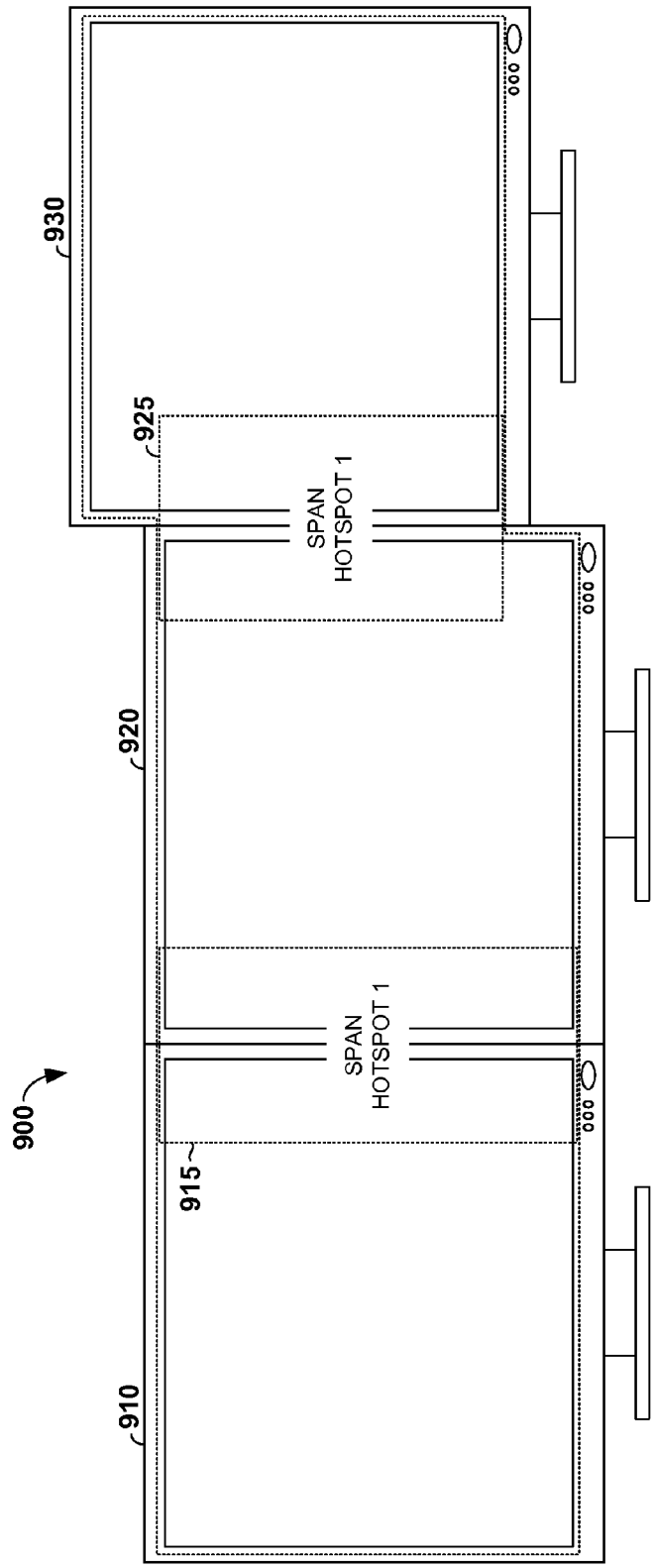
FIG. 9 is a diagram of a computer-display environment depicting two "span" hotspots into which an image icon may be dragged, in accordance with an embodiment of the present invention.

Turning now to FIG. 9, a computer-display environment 900 illustrating span hotspots is shown, in accordance with an embodiment of the present invention. The computer-display environment 900 includes monitor 910, monitor 920, and monitor 930. As can be seen, monitor 910 and monitor 920 are the same size and adjacent to one another. In addition, the top and bottom of each monitor line up. In contrast, monitor 930 is offset from its adjacent monitor 920. In other words, the top of monitor 930 does not line up with the top of monitor 920. Similarly, the bottom of monitor 930 does not line up with the bottom of monitor 920. Embodiments of the present invention may be practiced in computer-display environments that include different size monitors in different orientations and alignments.

The computer-display environment 900 includes a first span hotspot 915 and a second span hotspot 925. The hotspot is a designated portion of the desktop into which a user may drag an image representation. By dragging the image representation onto either span hotspot the user selects the image-processing format they want used to generate the desktop background. In one embodiment, when the user drags the image representation into a span hotspot, a preview is generated based on the image-processing format associated with the hotspot and the image associated with the image representation. The span hotspot, such as span hotspot 915, is on a portion of monitor 910 and a portion of monitor 920. Similarly, span hotspot 925 is on a portion of monitor 920 and a portion of monitor 930. As described previously, the span format takes a single image and uses it to generate a desktop that spans multiple monitors. In the example shown, the span hotspot 915 causes a single image to be spanned across monitor 910 and monitor 920. The span hotspot 925 causes the image to be spanned across the desktop background displayed on monitor 920 and on monitor 930.

In one embodiment, a span hotspot may contain multiple portions each associated with a different method of spanning an image across two monitors to form a background. For example, a portion of the span hotspot could be associated with cropping an image to form a background that spans two monitors. Another portion of the span hotspot may be associated with a method of stretching the image to form a desktop that spans both monitors. In one embodiment, the different portions of the span hotspots are delineated with lines or colors. Further, the different portions may be associated with text that explains the image-processing format associated with the hotspot.

Figure 10:
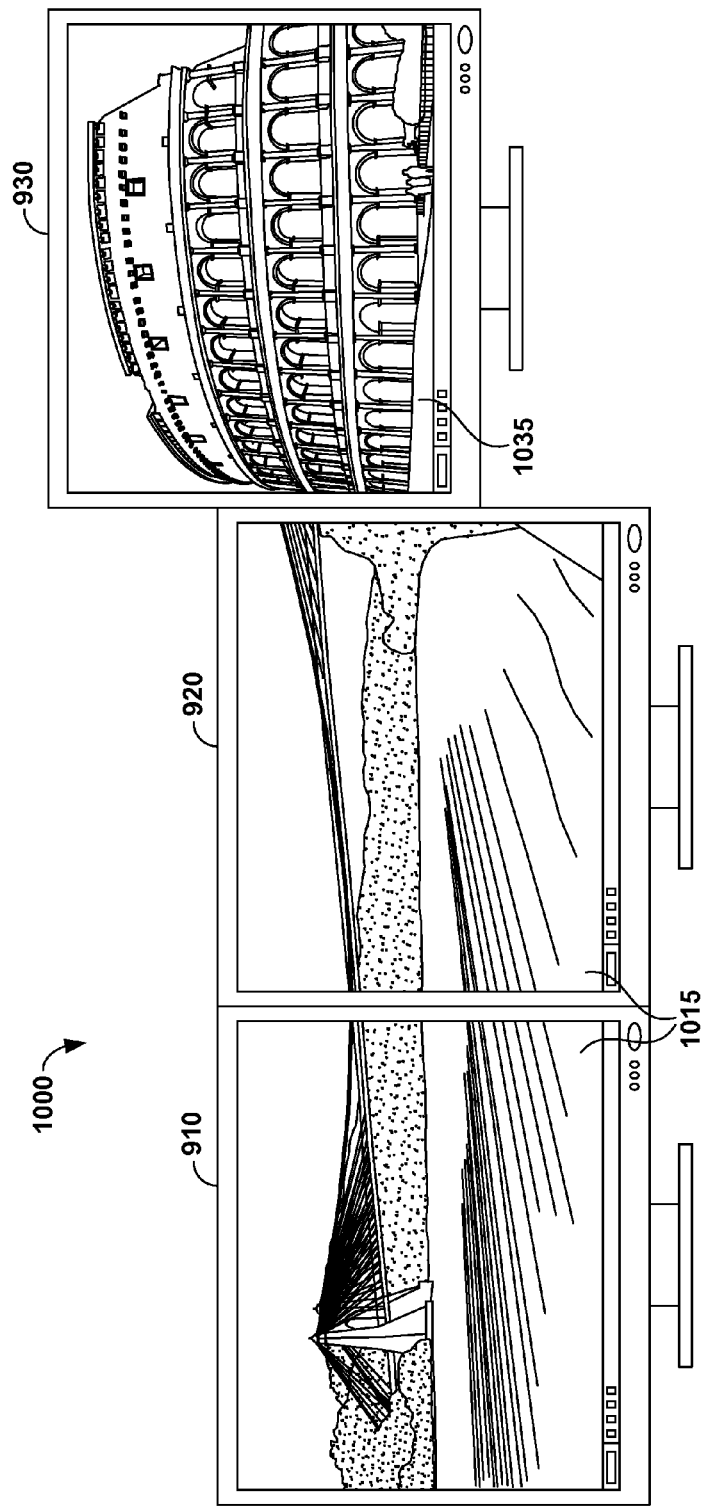
FIG. 10 is a diagram of a computer-display environment showing an image spanned across two of three monitors, in accordance with an embodiment of the present invention.

Turning now to FIG. 10, a computer-display environment 1000 that illustrates the resulting backgrounds generated when an image representation is dragged into span hotspot 915 is shown, in accordance with an embodiment of the present invention. It should be noted that the background 1035 shown on monitor 930 may have been a previous background or a user could have dragged a different image representation onto the background associated with monitor 930. As can be seen, the desktop background 1015 is generated based on a single picture of a bridge and spans both monitor 910 and monitor 920. In the example shown, the image used to generate the background 1015 may have been cropped or stretched to fit the two monitors according to a user's preferences.

Figure 11:
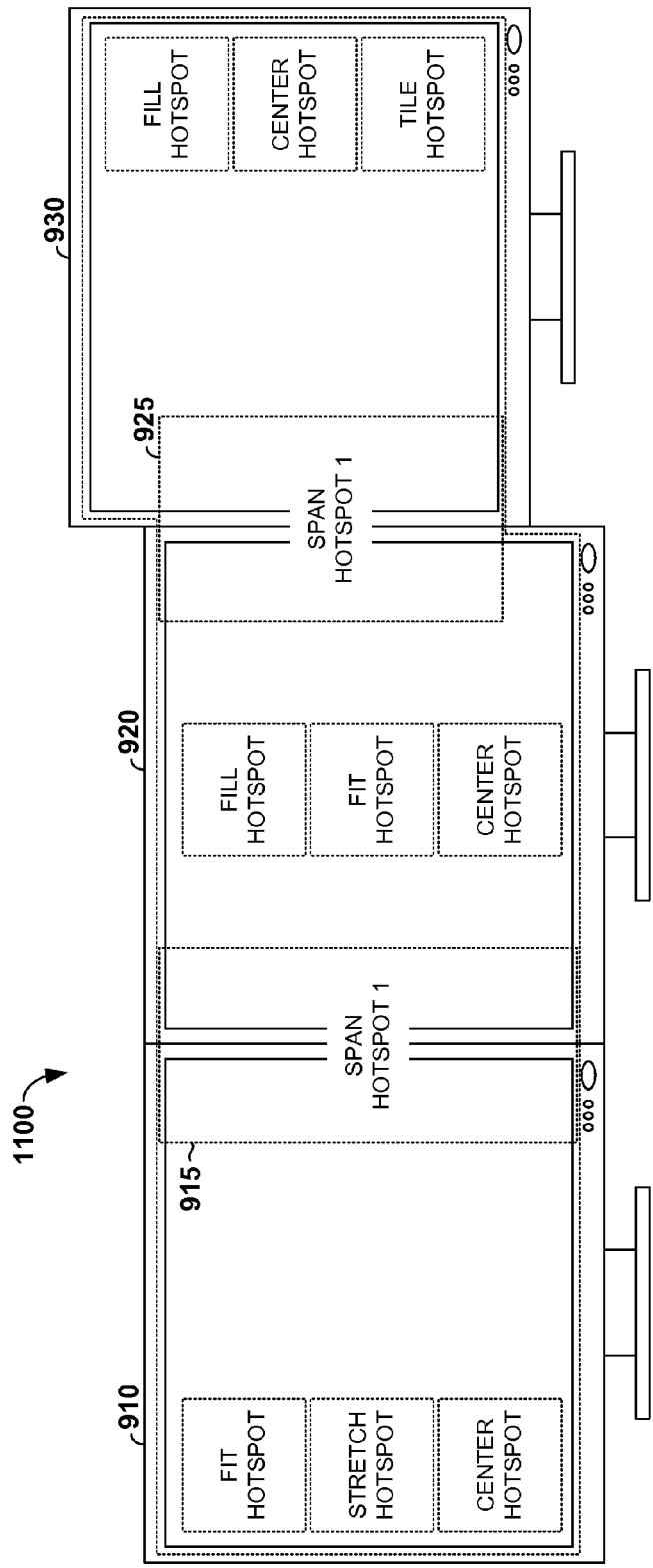
FIG. 11 is a diagram of a computer-display environment depicting multiple hotspots into which an image icon may be dragged, in accordance with an embodiment of the present invention.

Turning now to FIG. 11, multiple hotspots are illustrated. In one embodiment, the hotspots only appear on the desktop once the desktop control panel is opened. In another embodiment, the hotspots appear only after an image representation is dragged from the desktop control panel onto a desktop background. The various hotspots allow a user to simultaneously select an image and an image-processing format by dropping the image representation onto the hotspot. In one embodiment, a preview of the background changes as the user hovers the representation over different hotspots. This allows the user to see which image-processing format produces the desired background.

Figure 15:
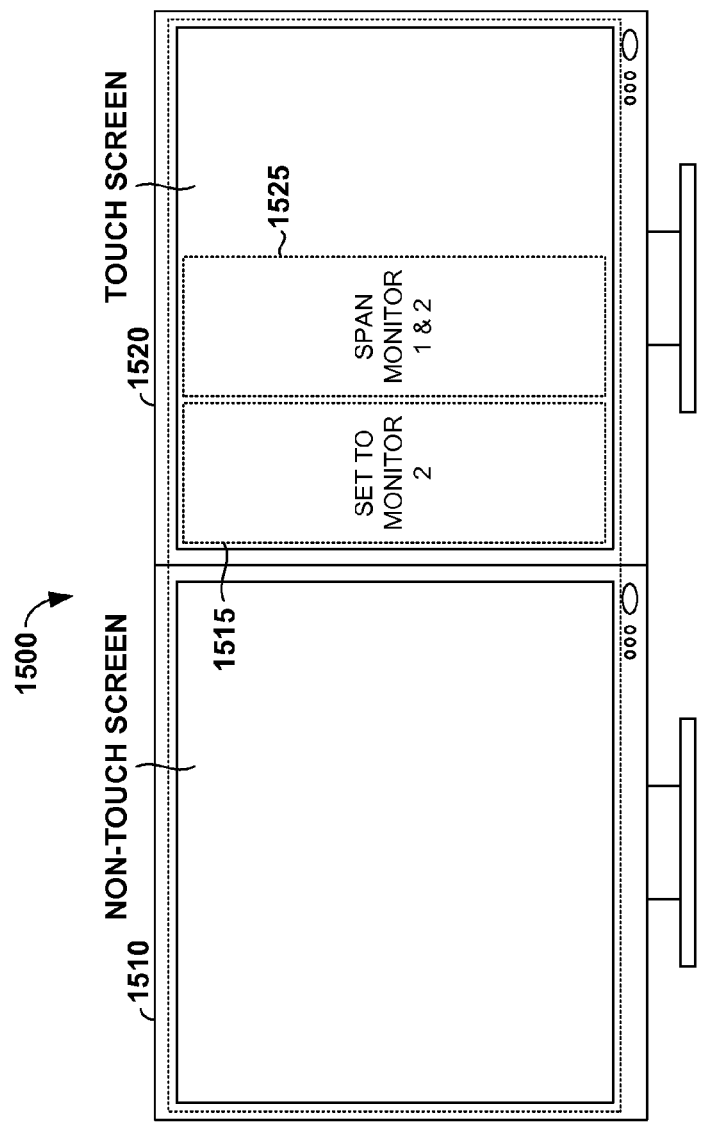
FIG. 15 is a diagram of a computer-display environment depicting multiple hotspots on a touch screen monitor, in accordance with an embodiment of the present invention.

Turning now to FIG. 15, a computer-display environment 1500 illustrating hotspots on a touch screen monitor is shown, in accordance with an embodiment of the present invention. The computer-display environment 1500 includes monitor 1510 and monitor 1520. As can be seen, monitor 1510 and monitor 1520 are the same size and adjacent to one another. In addition, the top and bottom of each monitor line up. As indicated, monitor 1520 is a touch screen monitor while monitor 1510 is not a touch screen monitor. A touch screen monitor acts as a user interface by receiving input from an object such as a stylus or human finger. The touch screen allows a user to select an image and drag the image to a hotpot. However, since monitor 1510 is not a touch screen the user cannot drag the image from monitor 1520 onto monitor 1510 using the touch interface on monitor 1520. If a user wanted to select an image with a mouse curser, then the user could drag an image from monitor 1520 onto monitor 1510. Embodiments of the present invention detect when a user is dragging an image using a touch screen interface and present additional hotspots on the touch screen monitor, in this case monitor 1520. In one embodiment, upon detecting that a user has selected and dragged an image onto the desktop via a touch screen interface, hotspots are only presented on the touch screen. Even though the hotspots are only presented on the touch screen, some hotspots on the touch screen monitor may allow the user to incorporate an image into the desktop of an adjacent monitor.

The computer-display environment 1500 includes a set to monitor 2 hotspot 1515 and a span hotspot 1525. As described, the hotspot is a designated portion of the desktop into which a user may drag an image representation. By dragging the image representation onto either span hotspot the user selects the image-processing format they want used to generate the desktop background. In one embodiment, when the user drags the image representation into a span hotspot, a preview is generated based on the image-processing format associated with the hotspot and the image associated with the image representation. As described previously, the span format takes a single image and uses it to generate a desktop that spans multiple monitors. In the example shown, the span hotspot 1525 causes a single image to be spanned across monitor 1510 and monitor 1520. The set to monitor 2 hotspot 1515 causes the image to be used as the desktop background on monitor 1510, which is the non-touch screen monitor. Thus, the desktop of an adjacent monitor may be changed through a hotspot that is not displayed on the adjacent monitor.

Figure 12:
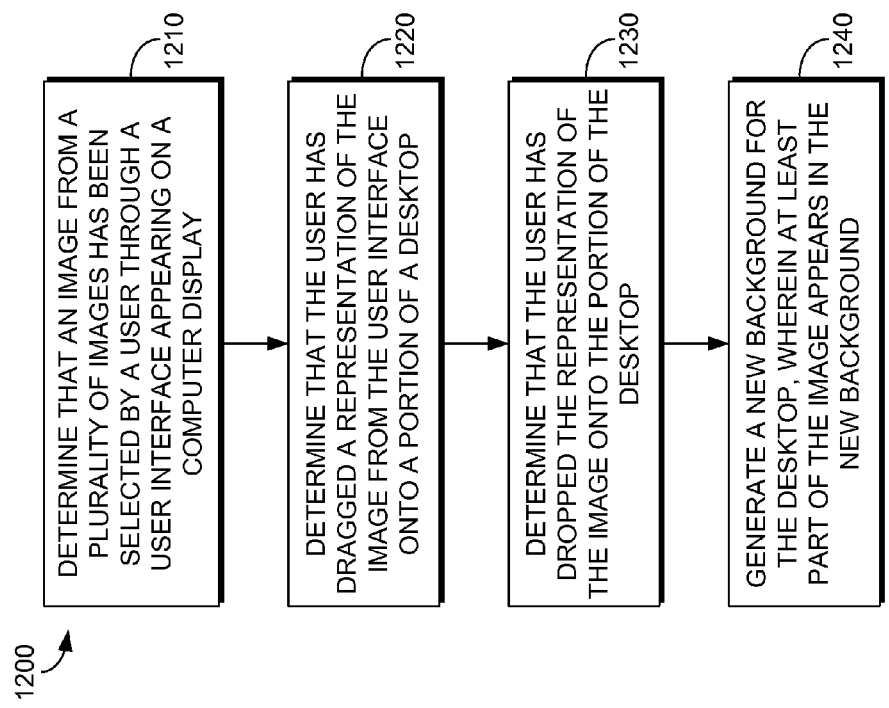
FIG. 12 is a flow chart depicting a method of customizing a desktop background, in accordance with an embodiment of the present invention.

Turning now to FIG. 12, a method 1200 of customizing a desktop background is provided, in accordance with an embodiment of the present invention. As described previously, a desktop may be a primary work space displayed on a computer screen by a computer program. In one embodiment, the computer program is an operating system. Icons and application windows may be displayed on top of the desktop. The desktop has a background. The background is the appearance of the desktop. The background may be a solid color. The background may consist of one or more images specified by a user or provided by a computer program. The background may also be built with various graphics and clip art. The desktop settings may also be updated through other interfaces on the computing device. For example, the desktop may be changed through an accessibility interface before or after the desktop image is set through method 1200. In addition, other methods of updating desktop features may be used in conjunction with the method 1200.

At step 1210, it is determined that an image from a plurality of images has been selected by a user through a user interface appearing on a computer display. In one embodiment, the user selects the image by clicking on a representation of the image with a pointing device. The pointing device may be a mouse cursor or a finger, a stylus or other object if the display is a touch screen. The interface may be a control panel that enables a user to customize the desktop. In one embodiment, the user interface is described as a desktop control panel. In other embodiments, the user interface is an application window in which representations of images are displayed. An example of such a user interface is a photo album. In an embodiment where the user interface is not specifically associated with modifying a desktop, a user may be able to right click on a representation of the image and select a control that indicates the user wishes to incorporate the image into the desktop background. Embodiments of the present invention then allow the image representation to be dragged and dropped onto the desktop or a portion of the desktop into which the user wants the image to be incorporated. The dragging and dropping operation is described in more detail subsequently. The image representation may be a thumbnail of the image, an icon representing the image, or other representation that identifies the image.

At step 1220, the user is determined to have dragged a representation of the image from the user interface onto a portion of the desktop. As described previously, a user may drag the representation by clicking on the representation and holding down the left mouse button while simultaneously moving the image. The representation of the image may move with the cursor as it moves around the display.

At step 1230 it is determined that the user dropped the representation of the image onto the portion of the desktop. The user may drop the representation of the image by releasing the left mouse button. In the touch screen embodiment, the user may drop the representation of the image by taking their finger, stylus, or other object off the touch screen. Embodiments of the present invention are not limited to using a mouse, or a touch screen controller. Any suitable controller through which a drag and drop operation can be performed may be utilized with the embodiments of the present invention.

At step 1240, without requiring any additional input from the user, a new background for the desktop is generated. At least part of the image appears in the new background. The image may be incorporated into the new background according to a default image-processing preference. Examples of such preferences have been described previously and include auto fit, auto fill, stretch, center, tile, and span. Thus, method 1200 allows the user to incorporate an image into a desktop background by only dragging the image to the desktop and dropping it. In an embodiment where the image is dragged and dropped from the desktop control panel, this results in the user being able to customize the desktop background in a single action.

Figure 13:
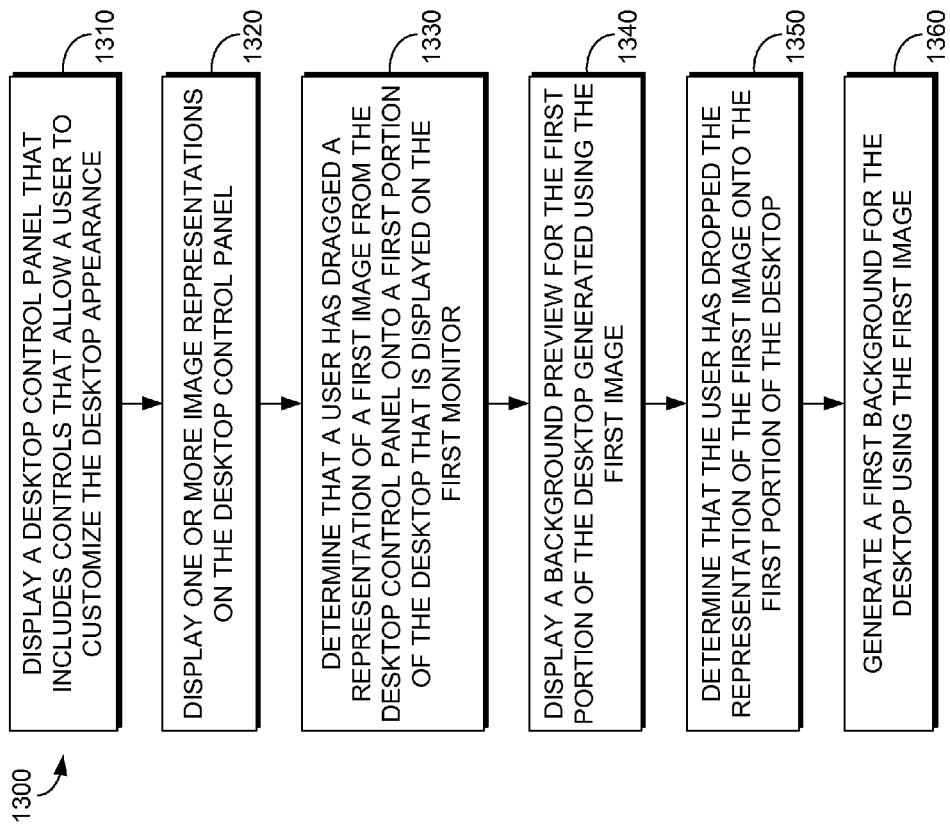
FIG. 13 is a flow chart depicting a method of designated images for use customizing a desktop background, in accordance with an embodiment of the present invention.

Turning now to FIG. 13, a method 1300 of designated images for use customizing a desktop background is provided, in accordance with an embodiment of the present invention. At step 1310, a desktop control panel is displayed on a first monitor that is communicatively coupled to a computing device. The desktop control panel includes controls that allow the user to customize the desktop appearance. In one embodiment, the desktop control panel allows the user to navigate to a source of images. The source of images may be an online source or a local source. For example, the desktop control panel may allow the user to navigate to an online photo album, social network page, or other online source of visual content. Similarly, the desktop control panel may allow the user to navigate to a local source of images such as a file of images located on the computing device's hard drive. The images may be digital pictures, clip art, graphics, and other visual content. In one embodiment, the desktop control panel is opened by clicking on the desktop and selecting a control that is displayed in response to initially clicking on the desktop.

At step 1320, one or more image representations are displayed on the desktop control panel. An image representation may be a thumbnail, icon, or other representation that is associated with the image. As described previously, the image representations may be based on images within a source that the user navigated to. At step 1330, the user is determined to have dragged a representation of a first image from the desktop control panel onto a first portion of the desktop that is displayed on the first monitor. In one embodiment, the first portion of the desktop is any portion of the desktop displayed on the first monitor. In one embodiment, upon the user dragging the first representation off the desktop control panel, the desktop control panel is glassified to reveal the desktop. In addition, any other application windows that happen to be open on the first monitor or any other monitor communicatively coupled to the computing device on which the desktop is extended may be glassified. In other embodiments, the application windows are minimized rather than glassified.

At step 1340, a background preview for the first portion of the desktop is displayed. The background preview is generated using the first image. The first portion of the desktop may be a portion of the desktop that is displayed on the first monitor. Depending on the image associated with the image representation and image-processing preferences, the background preview may be displayed in less than the entire portion of the desktop. In one embodiment, the background preview is a hazy or fuzzy rendering of an actual desktop background to indicate that it is a preview. In other embodiments, the background preview appears just as an actual desktop background would appear.

At step 1350, the user is determined to have dropped the representation of the first image onto the first portion of the desktop. At step 1360, a first background for the desktop that is displayed on the first monitor is generated. At least a part of the first image appears in the first background. In one embodiment, the image could be cropped so that the entire image does not appear in the desktop background. As described previously, this process may be repeated with multiple images and multiple portions of the desktop. In one embodiment, a user may drag a separate image onto portions of the desktop displayed on different monitors. Thus, each monitor may have its own desktop background. Embodiments of the present invention are not limited to a certain number of monitors or desktop backgrounds. Embodiments of the present invention allow the user to specify as many different backgrounds as there are monitors. The number of monitors a computing device can support depends on the hardware of the computing device and the software operating on the computing device. Also as described previously, the user may choose an image-processing preference that allows an image to be spanned across multiple monitors.

Figure 14:
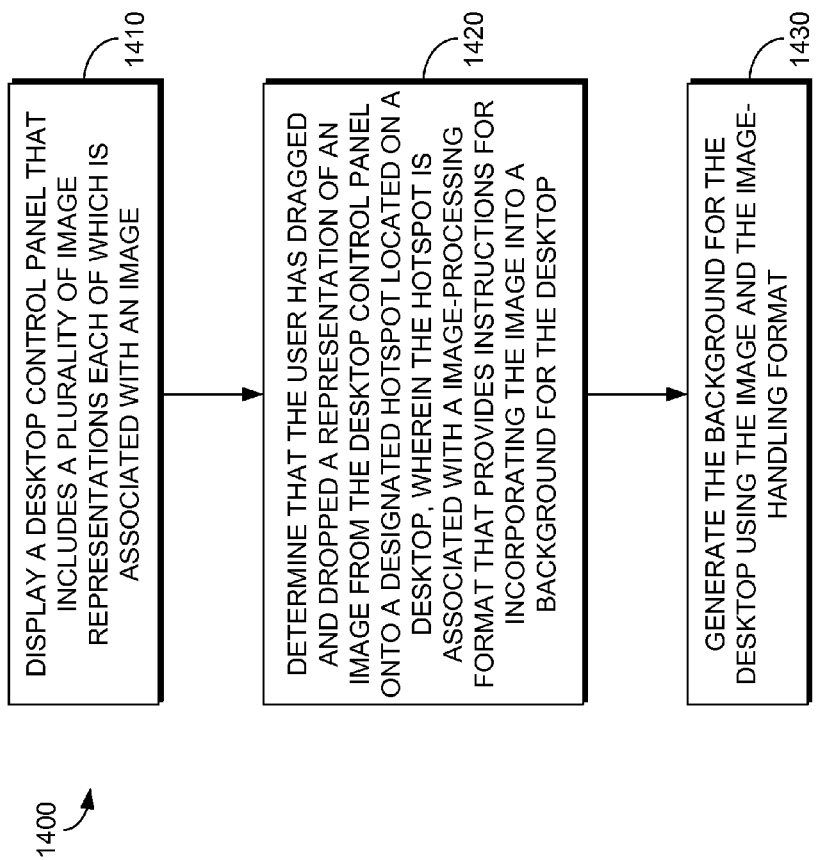
FIG. 14 is a flow chart depicting a method for customizing a desktop background, in accordance with an embodiment of the present invention.

Turning now to FIG. 14, a method 1400 for customizing a desktop background is provided, in accordance with an embodiment of the present invention. At step 1410, a desktop control panel is displayed on a monitor that is communicatively coupled to a computing device. The desktop control panel includes a plurality of image representations, each of which is associated with an image. At step 1420, the user is determined to have dragged and dropped a representation of an image from the desktop control panel onto a designated hotspot located on a desktop. The hotspot is associated with an image-processing format that defines how the image should be incorporated into the desktop background. Image-processing formats include auto fit, auto fill, stretch, center, span, and tile. These formats have been described previously. In one embodiment, the hotspots are delineated by dashed lines or solid lines or otherwise visibly differentiated on the desktop. Each hotspot may be associated with a visible description of the image-processing format associated with the hotspot. In one embodiment, the explanation for the image-processing format is provided as the user hovers over the hotspot. Utilizing hotspots allows the user to customize a background with an image and specify the image-processing format with a single action of dragging and dropping the image onto the hotspot.

At step 1430, the background for the desktop is generated using the image and the image-processing format associated with the hotspot. In one embodiment, a preview of a desktop background as it would look incorporating the image according to the image-processing format associated with the hotspot is generated when the user hovers the image representation over a particular hotspot. Different previews may be generated as the user moves the image representation from hotspot to hotspot. The preview generated corresponds to the image-processing format associated with the hotspot. In this way, a user may quickly determine the best image-processing format for the image associated with the image representation they have selected.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media devices having computer-executable instructions embodied thereon for performing a method of customizing a desktop background, the method comprising:

determining that an image from a plurality of images has been selected by a user through a user interface appearing on a computer display;

determining that the user has dragged a representation of the image from the user interface onto a hotspot located on a portion of a desktop where each hotspot is associated with a particular image-processing format that provides instructions for incorporating the image into a background for the desktop, wherein the particular image-processing format comprises one or more of a fill format, a fit format, a stretch format, a tile format, a center format, an auto format, and a span format;

upon said determining that the user has dragged the representation of the image from the user interface onto the hotspot and upon determining that the user has not dropped the representation of the image from the user interface onto the hotspot, automatically displaying a preview of the desktop background generated using at least part of the image;

determining that the user has dropped the representation of the image onto the hotspot; and without requiring any additional input from the user, generating a new background for the desktop, wherein at least part of the image appears in the new background, wherein generating the new background is based on 1) the particular image-processing format associated with the hotspot where the user has dragged the representation in the context of the desktop and 2) the image selected by the user, wherein the new background comprising at least part of the image is generated in the context of the desktop.

2. The media of claim 1, wherein the method further comprises upon said determining that the user has dragged the representation of the image from the user interface onto the hotspot, changing an appearance of the user interface to make more of the desktop's background visible.

3. The media of claim 1, wherein the method further comprises upon said determining that the user has dragged and not dropped the representation of the image from the user interface onto the hotspot, changing an appearance of one or more currently open application windows to make more of the desktop's background visible.

4. The media of claim 1, wherein said changing comprises rendering transparent the one or more currently open application windows.

5. The media of claim 1, wherein the user interface is a digital photo album.

6. The media of claim 1, wherein the method further comprises displaying a hint adjacent to the representation of the image that communicates what will happen to the desktop's background upon the user dropping the representation of the image.

7. A method of designating images for use in customizing a desktop background, the method comprising:
displaying, on a first monitor that is communicatively coupled to a computing device, a desktop control panel that includes controls that allow a user to customize the desktop's appearance;
displaying one or more image representations on the desktop control panel;
determining that the user has dragged and not dropped a representation of a first image from the desktop control panel onto a first hotspot located on a portion of the desktop that is displayed on the first monitor, the first hotspot is associated with a particular image-processing format that provides instructions for incorporating the first image into a background for the desktop, wherein the particular image-processing format comprises one or more of a fill format, a fit format, a stretch format, a tile format, a center format, an auto format, and a span format;
upon determining that the user has dragged and not dropped a representation of a first image from the desktop control panel onto a first hotspot located on a portion of the desktop that is displayed on the first monitor, automatically displaying a background preview for the first hotspot, wherein the background preview is generated using the first image;
determining that the user has dropped the representation of the first image onto the first hotspot; and
generating a first background for the desktop that is displayed on the first monitor, wherein at least part of the first image appears in the first background, wherein the first background comprising at least part of the first image is generated in the context of the desktop.

8. The method of claim 7, wherein the method further comprises:
determining that the user has designated a second image for use in forming a background for a second hotspot located on a portion of the desktop displayed on a second monitor that is communicatively coupled to the computing device, wherein the user designated the second image by dragging and dropping a representation of the second image onto the second hot spot; and
generating a second background for the desktop that is displayed on the second monitor, wherein at least part of the second image appears in the new background.

9. The method of claim 7, wherein the method further comprises:
receiving multiple additional indications that the user has designated additional images for use in forming a background for additional hotspots displayed on additional monitors that are communicatively coupled to the computing device; and
generating additional backgrounds for the hotspots that are displayed on the additional monitors.

10. The method of claim 7, wherein the first image is incorporated into the first background according to an image-processing format.

11. The method of claim 10, wherein the image-processing format is one of fit to screen, fill to screen, stretch to screen, tile, and center.

12. The method of claim 11, wherein the image-processing format is selected through a preference associated with the first hotspot.

13. The method of claim 7, wherein the method further comprises displaying a hint adjacent to the representation of the first image that communicates what happens to the desktop's background upon the user dropping the representation of the first image.

14. A method for customizing a desktop background, the method comprising:
displaying, on a monitor that is communicatively coupled to a computing device, a desktop control panel that includes a plurality of image representations each of which is associated with an image;
determining that an image representation from the plurality of image representations has been selected by a user through the desktop control panel;
determining that a user has dragged and dropped the selected image representation from the desktop control panel onto a hotspot located on a desktop, wherein the hotspot is associated with a particular image-processing format that provides instructions for incorporating the image corresponding to the selected image representation into a background for the desktop, wherein the particular image-processing format comprises one or more of a fill format, a fit format, a stretch format, a tile format, a center format, an auto format, and a span format; and without requiring any additional input from the user, generating the background for the desktop using the image corresponding to the selected image representation and the particular image-processing format, wherein the background for the desktop is generated in the context of the desktop, and further wherein at least a part of the image corresponding to the selected image representation appears in the background, wherein generating the background is based on 1) the particular image-processing format associated with the hotspot where the user has dragged and dropped the selected image representation from the desktop control panel and 2) the image corresponding to the selected image representation.

15. The method of claim 14, wherein the hotspot is visibly delineated on the desktop.

16. The method of claim 14, wherein the method comprises displaying a hint adjacent to the representation of the image that communicates what happens to the desktop's background upon the user dropping the representation of the image.

17. The method of claim 14, wherein the image-processing format causes the image to be spanned across two or more monitors.

18. The method of claim 17, wherein the hotspot is located on an edge of the desktop that is adjacent to a second monitor.

19. The method of claim 14, wherein a hint is provided within each hotspot describing the image-processing format with which the hotspot is associated.

\* \* \* \* \*